United States Patent [19]

Samimi et al.

[11] Patent Number: 5,612,076
[45] Date of Patent: Mar. 18, 1997

[54] METHOD FOR THE PASTEURIZATION OF EGG PRODUCTS USING RADIO WAVES

[75] Inventors: Mohammad-H. H. Samimi, Eden Prairie, Minn.; Kenneth R. Swartzel, Raleigh; Hershell R. Ball, Jr., New Hill, both of N.C.

[73] Assignees: North Carolina State University, Raleigh, N.C.; Michael Foods, Minneapolis, Minn.

[21] Appl. No.: 139,185

[22] Filed: Oct. 19, 1993

[51] Int. Cl.⁶ .................................. A23L 1/32; A23L 3/01
[52] U.S. Cl. .................... 426/234; 426/241; 426/407; 426/614; 426/521
[58] Field of Search .................... 426/614, 234, 426/237, 241, 298, 399, 407, 521

[56] References Cited

U.S. PATENT DOCUMENTS

| | | | |
|---|---|---|---|
| 1,092,897 | 4/1914 | Clairemont . | |
| 2,423,233 | 8/1942 | Funk | 99/161 |
| 2,500,396 | 3/1950 | Barker | 259/95 |
| 2,576,236 | 10/1952 | Paden | 99/113 |
| 2,618,216 | 11/1953 | Mulvany | 99/241 |
| 2,673,160 | 3/1954 | Feeney et al. | 99/161 |
| 2,725,062 | 11/1955 | Vile | 134/94 |
| 3,041,212 | 6/1962 | Booth | 134/21 |
| 3,144,342 | 8/1964 | Collier et al. | 99/161 |
| 3,211,659 | 10/1965 | Pikaar | 252/136 |
| 3,615,726 | 10/1971 | McMillan | 426/241 |
| 3,830,945 | 8/1974 | Scharfman | 426/243 |
| 3,843,813 | 10/1974 | Driggs | 426/241 |
| 4,091,119 | 5/1978 | Bach . | |
| 4,808,425 | 2/1989 | Swartzel et al. . | |
| 4,853,238 | 8/1989 | Huang . | |
| 4,957,760 | 9/1990 | Swartzel et al. . | |
| 4,975,246 | 12/1990 | Charm . | |
| 5,105,724 | 4/1992 | Swartzel et al. . | |
| 5,288,471 | 2/1994 | Corner | 422/307 |

FOREIGN PATENT DOCUMENTS

| | | |
|---|---|---|
| 459566 | 9/1949 | Canada . |
| 701272 | 1/1965 | Canada . |
| 72454 | 5/1953 | Netherlands . |
| 93/03622 | 3/1993 | WIPO . |

OTHER PUBLICATIONS

New Riverside University Dictionary, 1984 p. 970.
W. J. Stadelman; *The Preservation of Quality in Shell Eggs*, Egg Science & Tech. 3rd Ed. 63–73 (1986).
K. R. Swartzel; *Equivalent–Point Method for Thermal Evaluation of Continuous–Flow Systems*, Agr. and Food Chem. 34:396–401 (May/Jun. 1986).
O. J. Cotterill et al.; *Thermal Destruction Curves for Salmonella oranienburg in Egg Products*, Dept of Food Science and Nutrition, 52:568–577 (1972).
*Egg Pasteurization Manual*, U.S. Dept. of Agriculture (Mar. 1969).
*Eggs and Egg Products, Microbial Ecology of Foods*, vol. II, 534–536 (1986).
W. W. Osborne et al.; *Heat Resistance of Strain of Salmonella in Liquid Whoel Egg, Egg Yolk, and Egg White*, 451–463 (1954).
J. R. Eilers; *Salmonella enteritidis*, Food Processing 240, 242 (May 1991).
*Salmonella Enteritidis in Eggs — Just the Facts*, Commercial Layers Newsletter, Poultry Science; vol. IV –CE, No. 1 (May 1988).
H. E. Goresline et al.; *Thermostabilization of Shell Eggs: Quality Retention in Storage*, USDA Circular No. 898:1–12 (1952).
D. B. Shah et al; *Thermal Resistance of Egg–Associated Epidemic Strains of Salmonella enteritidis*, J. of Food Science, 56:391–393 (1991).

(List continued on next page.)

Primary Examiner—Anthony J. Weier
Attorney, Agent, or Firm—Bell, Seltzer, Park & Gibson, P.A.

[57] ABSTRACT

A method of, and apparatus for, pasteurizing flowable egg products utilizing high frequency radio waves to heat the egg products being pasteurized.

2 Claims, 1 Drawing Sheet

OTHER PUBLICATIONS

R. K. Gast et al.; *Detection of Enumeration of Salmonella enteritidis in Fresh and Stored Eggs Laid by Experimentally Infected Hens. J. of Food Protection*, 55:152–156 (Mar. 1992).

T. S. Hammack et al.; *Research Note: Growth of Salmonella enteritidis in Grade A Eggs During Prlonged Storage, Poultry Science*, 72:373–377 (1993).

W. J. Scott et al.; *Studies in the Preservation of Shell Eggs, VII. The Effect of Pasteurization on the Maintenance of Physical Quality, Aust. J. Appl. Sci.* 5:89–102 (1954).

*Treating Shell Eggs to Maintain Quality, North Central Regional Publication*, No. 659 (Aug. 1955).

H. G. Barott et al.; *Heat Treating Shell Eggs: Opacity and Infertility Produced by Thermostabilization Process at 125° and 144° F., U.S. Egg and Poultry Mag.*, 320–322 (1943).

R. E. Feeney et al.; *High Temperature Treatment of Shell Eggs, Food Technology*, 242–245 (May 1954).

E. M. Funk; *Stabilizing Quality in Shell Eggs, Univ. of Missouri Research Bulletin* 362, 1–38 (1943).

C. Beard, *Where are we with S. e.?, Egg Industry*, Jul./Aug. 1992.

*Washes and Pasteurizes Eggs, Food Industries*, 341 Mar. 1948.

"Magna Tube" Sales brochure; Proctor Strayfield, Horsham, Pennsylvania.

Goldblith, *Principles and application of radio-frequency energy to food preservation with particular reference to concentration and dehydration, Academic Press, NY* Freeze Drying and Advanced Food Technology, 691–714 (1975).

Adey, *Biological effects of radio frequency electromagnetic radiation*, Electromagnetic Interaction with Biological Systems Lin (Ed.) Plenum Press, 109–140 (1989).

Koral, A.L., *Proctor–Stayfield Magnature Radio Frequency Tube Heating System Proctor Strayfield, Horsham, PA*.

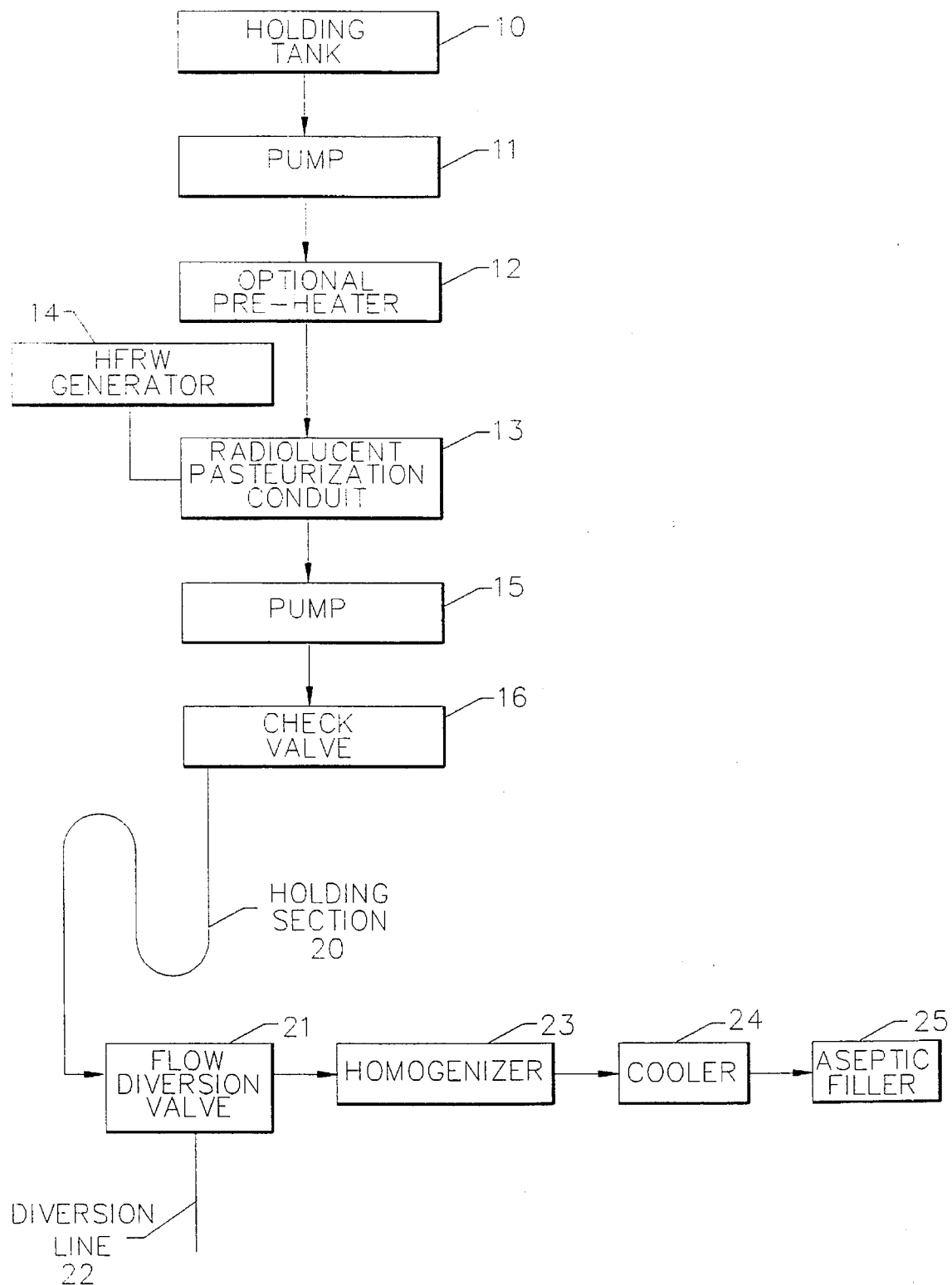

METHOD FOR THE PASTEURIZATION OF EGG PRODUCTS USING RADIO WAVES

FIELD OF THE INVENTION

The present invention relates to a method of pasteurizing flowable egg products utilizing high frequency radio waves.

BACKGROUND OF THE INVENTION

Large quantities of liquid egg products are pasteurized each year to produce products sold in refrigerated form with limited shelf life. See generally, *Egg Pasteurization Manual* (USDA Agricultural Research Service 1969). More recently, the provision of techniques for ultrapasteurizing liquid egg products has led to the marketing of liquid egg products which have extended shelf lives under refrigerated conditions.

Methods of ultrapasteurizing liquid whole egg products using indirect heat, such as contacting the liquid whole egg product to a heated surface, or direct heat, such as contact to or the injection of steam, are known. See U.S. Pat. Nos. 4,808,425 to Swartzel et al.; 5,105,724 to Swartzel and Ball; and 4,957,760 to Swartzel et al.

U.S. Pat. No. 4,091,119 to Bach discloses a method and apparatus for uniform heating of a foodstuff for preservation using high-frequency electromagnetic fields. The foodstuff (in particular, a jam, marmalade or jelly) is located in a container open at its top, and two fields, one high frequency and another ultra-high frequency, are directed as different portions of the foodstuff container. Use of a high frequency field of between 1–300 MHz, used in conjunction with an ultra-high frequency field of between 300 MHz and 5 GHz, is disclosed.

U.S. Pat. No. 4,853,238 to Huang discloses a method for treating liquid egg white or liquid whole egg in order to extend the shelf-life of the liquid egg material. The liquid egg material is subjected to microwave energy while it flows in a conduit for a time sufficient to inactivate or destroy a sufficient amount of microorganisms in the material without significantly reducing the egg protein functionality of the material.

U.S. Pat. No. 4,975,246 to Charm discloses a method and apparatus for pasteurizing and/or sterilizing heat-sensitive material using high-temperature, short-time heating to substantially destroy selected microorganisms without substantially affecting other desirable properties of the material. Heat-sensitive material, such as liquid egg product, is continually passed through a flow path, such as plastic tubing, subjected to microwave radiation to heat the material to a high temperature for a short period, and then rapidly cooled.

SUMMARY OF THE INVENTION

Disclosed is a method of pasteurizing a flowable egg product in a continuous flow apparatus. The method comprises the steps of: (a) passing a flowable egg product continuously through a conduit transparent to high frequency radio waves; (b) heating the flowable egg product to a predetermined temperature by subjecting it to high frequency radio waves; and then (c) holding the flowable egg product at said predetermined temperature for a predetermined time; wherein the total thermal treatment of the product is sufficient to pasteurize the product. Preferably, the total thermal treatment is sufficient to achieve a five, six, seven or even nine log cycle reduction in *Listeria monocytogenes* without significantly reducing the egg functionality.

An apparatus for pasteurizing a flowable egg product is also disclosed. The apparatus comprises: (a) an egg product holding tank; (b) an egg product line connected to the holding tank; (c) pumping means connected to the egg product line for establishing an egg product stream in the egg product line; (d) a radiolucent conduit interposed in the egg product line; (e) a generator capable of generating high frequency radio waves and placed so that radio waves generated pass through the radiolucent conduit to heat the egg product stream; (f) a holding section in the egg product line after the radiolucent conduit.

Radio frequency energy has been reported as being used to scramble eggs (See, e.g., "Magna-Tube" heat processing equipment sales brochure, Proctor Strayfield, Horsham, Pa.), but has not heretofore been suggested for use in pasteurizing egg. Advantages of high frequency radio waves for egg pasteurization include, among other things, the uniformity of heating provided thereby, the avoidance of adding water to the product such as by steam injection, and the avoidance of fouling of heated surfaces.

The foregoing and other objects and aspects of the present invention are explained in detail in the specification set forth below.

BRIEF DESCRIPTION OF THE DRAWINGS

The FIGURE schematically illustrates an apparatus for carrying out the present invention.

DETAILED DESCRIPTION OF THE PREFERRED EMBODIMENTS

Examples of pasteurized liquid whole egg products which may be produced by the method of the present invention include whole egg, fortified whole egg (whole egg with added yolk), salt whole egg (e.g., salt 10%), sugar whole egg (e.g., sugar 10%), blends of whole egg with syrup solids, syrups, dextrose and dextrins and/or gums and thickening agents, blends of whole eggs with less than 1% sugar and/or salt, scrambled egg mixes (for example, a mix of about 51% egg solids, 30% skim milk solids, 15% vegetable oil and 1.5% salt), reduced cholesterol egg products and blends thereof, custard blends, and the like, that is products containing at least about 10% egg solids. Products which are extremely sensitive to thermal processing and which are particularly suitable for ultrapasteurization by the present invention include, for example, liquid whole egg and blends thereof (less than 2% added non-egg ingredients), fortified whole egg and blends thereof (24–38% egg solids, 2–12% added non-egg ingredients), liquid salt whole egg, liquid sugar whole egg, and other liquid whole egg blends which are 24–38% egg solids and 12% or less of added non-egg ingredients. Terms used herein have their standard meaning in accordance with industry and regulatory usage. See, e.g., 7 C.F.R. §59.570(b) (1985).

As used herein, ultrapasteurization means pasteurization which results in pasteurized products with shelf lives under refrigerated conditions (e.g., 4° Centigrade or less, but above freezing) greater than that obtainable using previously known pasteurization methods. See, e.g., K. Swartzel et al., U.S. Pat. No. 4,808,425 (the disclosure of which is intended by applicants to be incorporated herein in its entirety). Thus ultrapasteurization methods produce extended shelf life products, e.g., products having shelf lives more than 10 days, and preferably more than 14 days, and typically 4 to 6 weeks and up to 36 weeks or more.

Methods and apparatus of the present invention are also suitable for pasteurizing shell eggs (i.e., eggs contained in the shell) and for pasteurizing egg products in individual consumer packages, such as restructured reduced-cholesterol eggs. Shell eggs and packaged liquid eggs or egg products can be placed in a liquid media so that they are flowable, i.e., able to flow through the pasteurizing apparatus of the present invention. Additionally, egg components (such as de-cholesterolized egg yolk) may be encapsulated in an edible material. The resulting capsules can then be carried in a liquid medium (preferably another egg component such as egg white) for pasteurization using the method and apparatus of the present invention. As used herein "flowable" means that the product to be pasteurized is capable of flowing through the pasteurizing apparatus of the present invention, either without the addition of a carrier or in a liquid carrier medium. Examples of flowable products include liquid egg products and particulate products carried in a liquid medium.

It is recommended that the equivalent point method for evaluating thermal treatments be applied in practicing the present invention. This method describes the total thermal treatment received by a product in continuous flow equipment. Procedures for using the equivalent point method for analyzing the thermal effects on products during continuous flow heating have been previously outlined (Swartzel (1982), *J. Food Science*, 47, 1886, and Swartzel (1986) *J. Agric. Food Chem.* 34, 397; U.S. Pat. No. 4,808,425 to Swartzel et al.) and are known to those skilled in the art.

The present invention utilizes that portion of the electromagnetic spectrum associated with radio reception (i.e., radio waves having a frequency of from about 500 Kilohertz (KHz) to about 110 Megahertz (MHz); or radio waves with wavelengths from about 1 meter to $10^4$ meters). In particular, the present invention uses high frequency radio waves. As used herein, high frequency radio waves (HFRW) means electromagnetic radiation having a frequency of from about 15 MHz to about 150 MHz, or wavelengths of from about 2 meters to about 20 meters. Alternating currents generate electromagnetic waves of a desired frequency and wavelength, which travel at a speed characteristic of the media in which they are traveling. The wavelength ($\gamma$) of a particular wave in a given egg product is determined from a knowledge of the frequency f, which remains constant (a function of the generator), and v, which depends on the velocity of the wave in the product.

The present invention utilizes high frequency radio waves to produce heat within the products being treated, causing microbial destruction without loss of product functionality, and yielding reduced or eliminated product deposition on the surfaces in contact with the product. It is not yet established whether microbial inactivation using electromagnetic waves is due to thermal effects only, as in conventional heating processes, or includes athermal effects resulting from unknown interactions between biochemical constituents of microbes and an electromagnetic field. See, e.g., Adey, Biological effects of radio frequency electromagnetic radiation, In: *Electromagnetic Interaction with Biological Systems*, Lin (Ed.)Plenum Press, New York, pp. 109–140 (1989). However, microbial destruction with electromagnetic waves producing heat generally yields results similar to that using conventional heat only. See, e.g. Goldblith, Principles and application of radio-frequency energy to food preservation with particular reference to concentration and dehydration, In: *Freeze Drying and Advanced Food Technology*, Goldblith, Rey & Rothmayr (Eds.), Academic Press, New York, pp. 691–714 (1975).

In the present invention, high frequency radio waves (HFRW) are converted to heat as they interact with the egg products. Absorption of electromagnetic energy increases the kinetic energy of the molecules of the absorbing medium, and increases the temperature of the absorbing medium. As heat is generated within the product being heated, contact with heated surfaces acting as heat transfer surfaces is not required. Thus fouling or burning of egg at heated surfaces is reduced or eliminated when using HFRW pasteurization techniques, allowing extended process runtimes. Thus the present invention will yield greater efficiency by achieving higher through-put of product before cleaning of equipment is required, while producing product with good functional characteristics.

Most pasteurization processes using indirect heat exchangers are designed to maximize turbulent, high-shear flow in order to achieve efficient heat transfer throughout the egg product. In HFRW heating, particulate matter heats at the same rate as liquids, allowing the pasteurization apparatus to be designed with less concern about the flow characteristics of the egg product. Shear stress on the proteins can be reduced, and the need to make highly homogeneous liquids from eggs can be eliminated. Thus low shear pumps may be used in practicing the present invention so that the identity of the yolks and egg whites is not lost.

HFRW heating is distinguished from higher energy microwave heating in that it is a process that is generally easier to control as the input of energy, and hence heating, is not as rapid. Microwaves are that portion of the electromagnetic energy spectrum with frequencies of from $10^3$ to $10^5$ MHz. Additionally, larger capacity heating sections can be constructed for use with HFRW (i.e., the cross-sectional area of a HFRW heater can be larger than that used in microwave heating processes) as the penetration depth of HFRW energy is greater than that of microwave energy. It is a well-known phenomena that as frequency increases, penetration of radio wave energy into matter decreases.

HFRW heating is distinguished from ohmic heating in that the heater design and controls are not dependent on the specific conductivity of the material being heated. For example, whole egg and scrambled egg mixes (whole egg with milk and salt) have sufficiently different electrical conductance that it is extremely difficult to heat them with the same ohmic heater, while a HFRW heater should be able to heat each product equally efficiently. HFRW heating does not create free radicals and the resulting deterioration of flavor as is found when high energy ionizing radiation is used to pasteurize egg products.

Any means for generating electromagnetic waves of the desired frequencies may be used to carry out the present invention. Any commercial or industrial generator capable of producing high frequency radio waves may be used. Generators may be added in parallel or in series to increase production or temperature. Generators may be harmonically suppressed or otherwise structured to meet standards for electromagnetic or radio frequency emissions. In a general embodiment of heating using HFRW, the product to be heated is situated between two electrode plates which are charged alternately positive and negative. The plates are connected to the radio frequency generator.

The conduit carrying the egg product adjacent to the HFRW generator is manufactured of material that is radiolucent, that is, is permeable to radio waves. As used herein, "radiolucent" means only that the material is essentially transparent to radio waves of the frequency used in the method of the present invention; while the material may be permeable to electromagnetic waves of other frequencies, this is not required. The conduits are preferably manufactured from a suitable synthetic plastics material. Examples of suitable materials include polytetrafluoroethylene (e.g., the product marketed as TEFLON™ or HOSTAFLON™), and polycarbonate resins such as LEXAN™.

Any means for establishing a continuous stream of egg product may be used to carry out the present invention. Pumps used to establish the stream may or may not be positive displacement pumps, though positive displacement pumps (timing pumps) are generally needed to precisely define the holding time of a product stream in a holding section. Positive displacement pumps may be used in combination with other pumping means, such as centrifugal pumps.

Ingredients may be added to or removed from the product stream in the present method at any location to provide the various egg products given above. The removal of cholesterol is discussed specifically below. Minor ingredients, such as salt, citric acid or phosphate to stabilize color, gums, oils, colors or flavors, may be added to the product stream, and may be added at any suitable time or location in the pasteurizing process.

A cholesterol removal step may optionally be included in the process of the present invention. The particular cholesterol removal procedure employed is not critical. Exemplary processes include those disclosed in A. Bayol et al., European Patent Application No. 89400175.9; U.S. Pat. No. 4,714,556; U.S. Pat. No. 4,361,484; U.S. Pat. No. 4,234,619; U.S. Pat. No. 3,882,034, and U.S. Pat. No. 3,607,304 (applicants specifically intend the disclosures of all U.S. patents cited herein to be incorporated herein in their entirety).

Using the method and apparatus of the present invention, it is possible to treat egg products from temperatures below 40° F. (but above freezing) up to temperatures above 160° F., but below cooking temperatures. The product is then held at the final temperature for a period of time adequate to destroy harmful and spoilage bacteria, as discussed below.

An optional preheating step may be employed prior to HFRW pasteurization to preheat the egg product to a temperature between 140° F. and 155° F. Preheating systems may be composed of, but are not limited to, conventional heating systems such as plate, swept, tube heat exchangers, microwave heating systems, ohmic systems, steam injection, hot water injection, hot fluid food injection, etc.

The total thermal treatment received by the egg product during the process must be sufficient to cause at least a nine log cycle reduction of Salmonella bacteria in the product (i.e., sufficient to pasteurize the product). Proper thermal treatment is typically insured by presetting the holding times. The term "holding time", as used herein, has its ordinary meaning as used in the industry, and all log cycle reductions referred to herein concern processed product as compared to raw or unprocessed product. Preferably, the thermal treatment is sufficient to produce a product having a shelf life of about four weeks to about thirty-six weeks under refrigerated conditions, and more preferably a product having a shelf life of about eight weeks to about thirty-six weeks under refrigerated conditions. The term "refrigerated," as used herein, means stored at or below a temperature of 4° Centigrade but above freezing.

Most preferably the holding time for the egg product is sufficient to cause a five, six, seven or even nine log cycle reduction in *Listeria monocytogenes* (Listeria) in the product. Listeria is found in a wide range of animals (including man), on plants, and in soil. See Microbiology, 799–800 (B. Davis et al., Eds., 3d Ed. 1980) (Harper & Row). A treatment capable of causing a nine log cycle reduction in Listeria is preferred because the wide-spread nature of Listeria makes it difficult to exclude from a pasteurizing plant, because of the pathogenic nature of this microorganism (see Id.) and because Listeria appears capable of growing to large quantities in egg under refrigerated conditions (the conditions contemplated for the products of the present process before preparation and consumption).

Following pasteurization the product can then be cooled using conventional cooling systems such as, but not limited to, plate heat exchangers, swept surface heat exchangers, liquid nitrogen injection, $CO_2$ gas injection, or injection of other inert gases.

Elements of the apparatus are interconnected by a product line formed of any conventional sanitary material, such as stainless steel tubing.

Raw product may be provided by conventional shell egg breaking apparatus, such as a Seymore breaker (not shown). The breaking apparatus may be in the same plant as the apparatus of the present invention, may be operatively connected to the apparatus of the present invention, or may be located in a separate plant.

To obtain a product with reduced quantities of microorganisms, the pasteurizing apparatus should be sterilized before the egg product is passed therethrough. Sterilizing is preferably accomplished by passing hot water under pressure through the pasteurizing apparatus, as is known in the art, so that hot water is contacted to those surfaces which contact the product at a temperature and pressure and for a time sufficient to sterilize these surfaces.

The product, after pasteurization, should be aseptically packaged. Aseptically packaged means packaged to the exclusion of microorganisms other than those carried by the egg product itself. Equipment suitable for aseptically packaging liquid egg products is commercially available. Also useful in carrying out this step is equipment which packages the product to the substantial exclusion of microorganisms, known in the industry as "clean fillers," but the greater exclusion of microorganisms provided by aseptic fillers makes aseptic fillers preferable, particularly in view of the ability of Listeria to grow under refrigerated conditions, as discussed above.

A homogenization step may optionally be included after the holding step. The term "homogenization" as used herein, means to subject a product to physical forces to reduce particle size. Such procedures are known in the art, and may be carried out on different types of equipment. It is preferable to carry out this homogenizing step with homogenizing equipment at total pressures of from about 500 p.s.i. to about 3,000 p.s.i.

An apparatus for carrying out the method of the present invention is shown schematically in the FIGURE. Arrowheads indicate the direction of flow of the product. This apparatus is readily assembled from commercially available parts. The apparatus of the FIGURE comprises a raw product holding tank (10) and a first pump (11) to pump the raw liquid product out of the holding tank and into the radiolucent pasteurization conduit (13). A preheater (12) may optionally be located intermediate the first pump (11) and the radiolucent conduit (13). A generator capable of generating HFRW (14) is located adjacent to the radiolucent conduit (13), such that high frequency radio waves generated pass through the radiolucent pasteurization conduit. A positive displacement pump (15) is positioned in the product line after the radiolucent pasteurization conduit, and a check valve (16) is positioned in the product line after the positive displacement pump and before the holding section (20). A flow diversion valve (21) in the product line following the holding section is provided for shunting improperly treated product to a holding tank (not shown) via a diversion line (22). The length of the holding section (20) is chosen to provide the desired holding time to the egg product carried therein. Optionally, a homogenizer (23) such as the Cherry Burrell Model HD-6 aseptic homogenizer follows the flow diversion valve. A cooler (24) such as the Cherry-Burrell Model 558X8 No-Bac SPIRATHERM™ tube-in-shell cooler follows the flow diversion valve and the (optional) homogenizer. An aseptic filler (25) such as the TETRA PAK™ Model AB-3-250 receives pasteurized egg product and aseptically packages the whole egg product stream carried therein in individual cartons.

It will be readily apparent to those of ordinary skill in the art that modifications of the pumping system described above will be required for pasteurizing non-liquid products, such as eggs in the shell, or pre-packaged egg products. Such products also may not require aseptic packaging following pasteurization.

In use for carrying out a method of the present invention for pasteurizing a liquid whole egg product, the apparatus of the FIGURE may, for example, be set so that HFRW having a wavelength of about 10 meters are generated and heat the liquid whole egg product in the radiolucent pasteurization conduit to about 64°–70° Centigrade. The holding section (20) is a length suitable to provide a holding time for the liquid egg product of about 2 to 5 minutes to thereby produce a pasteurized liquid egg product. To produce a product with greater kills of Listeria, the holding section is lengthened to give a holding time of up to 9 minutes for some products.

In another embodiment of the present invention, a preheater (12) such as a Cherry-Burrell Model E SUPER-PLATE™ preheater, preheats the egg product to a temperature between 135° F. and 155° F. prior to the egg product being pumped into the radiolucent conduit, where the final portion of heating is achieved by HFRW.

Those skilled in the art will appreciate that the present invention can be combined with the features of other egg pasteurization techniques, such as described in U.S. Pat. Nos. 4,808,425, 5,105,724, and 4,957,760 (the disclosures of which are intended by applicants to be incorporated herein in their entirety), and that these techniques can be resorted to for further guidance in practicing the present invention.

Those skilled in the art will appreciate that minor variations can be made in the apparatus and procedures described herein without departing from the spirit of the present invention. Thus the invention is defined by the following claims, with equivalents of the claims to be included therein.

That which is claimed is:

1. A method of pasteurizing a flowable egg product while passing the product as a continuous stream through a pasteurizing apparatus, comprising:

passing said flowable egg product continuously through a conduit transparent to high frequency radio waves, wherein said flowable egg product comprises shell eggs in a liquid medium; and heating said flowable egg product in said conduit to a predetermined temperature by subjecting said egg product to high frequency radio waves; and then holding said flowable egg product at said predetermined temperature for a predetermined time to provide a total thermal treatment to said egg product;

wherein the total thermal treatment of said product is sufficient to pasteurize said egg product without coagulation thereof, and wherein said high frequency radio waves are in the frequency range from about 15 MHz to 150 MHz.

2. A method of pasteurizing a flowable egg product while passing the product as a continuous stream through a pasteurizing apparatus, comprising:.

passing said flowable egg product continuously through a conduit transparent to high frequency radio waves, wherein said flowable egg product comprises prepackaged egg products in a liquid medium; and heating said flowable egg product in said conduit to a predetermined temperature by subjecting said egg product to high frequency radio waves; and then holding said flowable egg product at said predetermined temperature for a predetermined time to provide a total thermal treatment to said egg product;

wherein the total thermal treatment of said product is sufficient to pasteurize said egg product without coagulation thereof, and wherein said high frequency radio waves are in the frequency range from about 15 MHz to 150 MHz.

\* \* \* \* \*

UNITED STATES PATENT AND TRADEMARK OFFICE
CERTIFICATE OF CORRECTION

PATENT NO. : 5,612,076
DATED : March 18, 1997
INVENTOR(S) : Samimi, e.t al.

It is certified that error appears in the above-identified patent and that said Letters Patent is hereby corrected as shown below:

Title page, item [56], References Cited, issue date for Patent No. 2,576,236 should be 11/1951. Issue date for Patent No. 2,618,216 should be 11/1952.

Column 3, line 42, the wavelength symbol "$(\gamma)$" should read -- $(\lambda)$.

Claim 2, delete "." after : in preamble.

Signed and Sealed this

Second Day of June, 1998

Attest:

Attesting Officer

BRUCE LEHMAN

Commissioner of Patents and Trademarks